Patented Mar. 27, 1923.

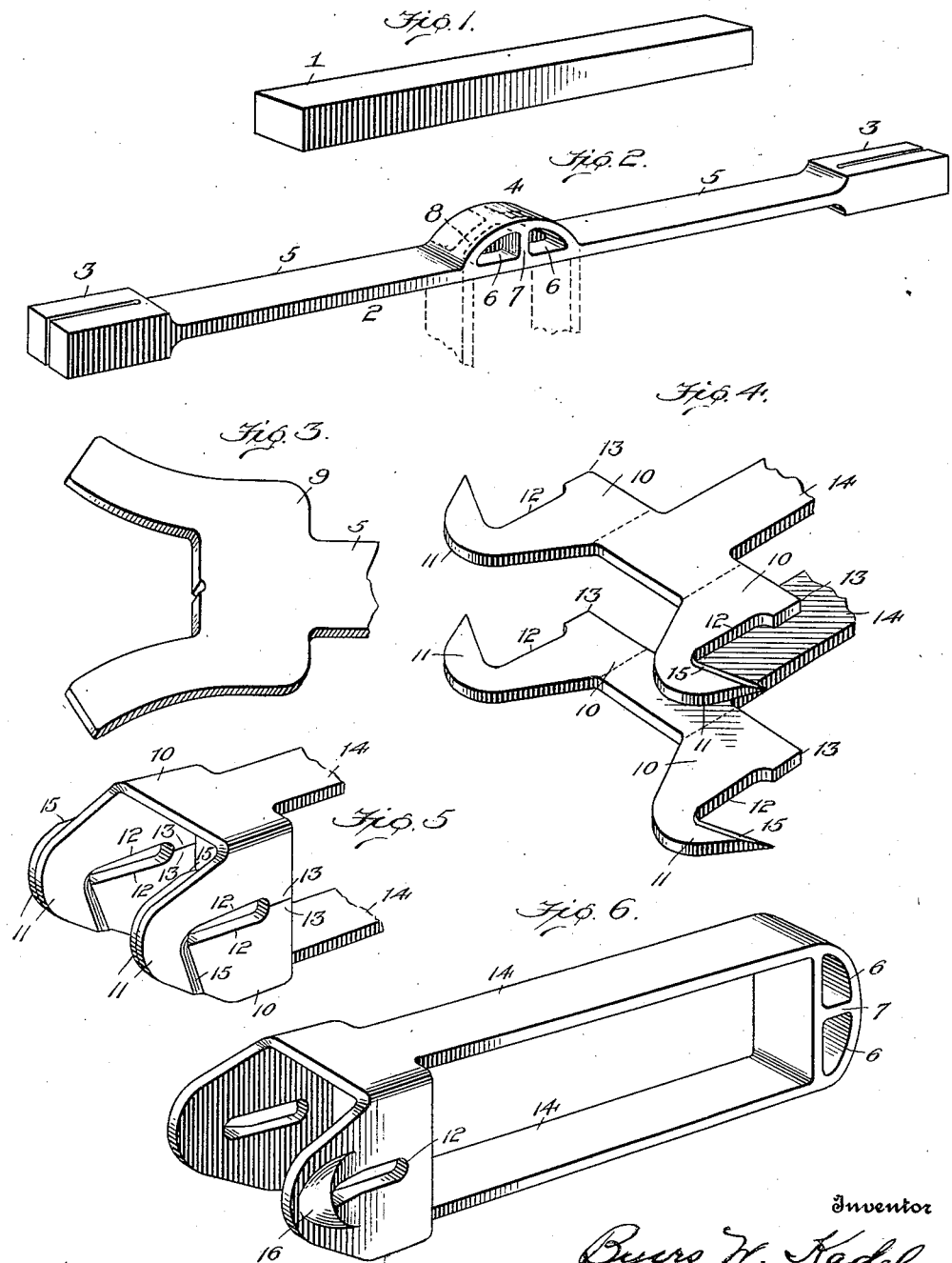

1,449,679

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

PROCESS OF MANUFACTURING DRAFT YOKES.

Application filed December 18, 1920. Serial No. 431,604.

*To all whom it may concern:*

Be it known that I, BYERS W. KADEL, a citizen of the United States, residing at Baltimore, in the State of Maryland, have invented certain new and useful Improvements in Processes of Manufacturing Draft Yokes; and I do hereby declare the following to be a full, clear, and exact description of the invention such as will enable others skilled in the art to which it appertains to make and use the same.

The invention relates to yokes for railway draft rigging, and more particularly to a process or method of forming yokes of this character from a single piece of metal by a combined shaping and welding process. To this end the principal object of my invention, broadly stated, consists in providing a process for the production of a yoke of the so-called hooded type and to so arrange the metal of the yoke as to afford maximum strength per unit of weight.

Another object of the invention is to provide a method of manufacturing a hooded draft rigging yoke wherein the rear end of the yoke is strengthened and reinforced without the use of separate reinforcing members, the said rear end being so constructed and arranged as to avoid all chances of deformation of the yoke at the juncture of the arms with the said rear end.

There are other objects of my invention, such for example, as the production of a strong, simple and reliable yoke; the elimination of waste of material in the manufacture thereof, and the reinforcement of the forward end of the key slot therein without the use of excess metal.

These and other objects of the invention will be readily apparent from the detailed description of the various steps of the process, particularly when taken in connection with the accompanying drawings wherein I have illustrated in the several figures the appearance of the yoke during the respective stages of its manufacture.

In the drawings:—

Figure 1 is a perspective view of a bar of wrought metal from which the yoke blank is formed.

Fig. 2 is a similar view of the yoke blank, formed by subjecting the bar to a shaping process to produce the thickened end portions and to a subsequent shaping process whereby the curved rear end portion of the yoke is formed, and also showing the thickened end portions cut longitudinally as a preliminary to the subsequent steps of the process; this figure also showing in dotted lines the position the yoke arms assume with reference to the curved rear end of the yoke after the same are bent into yoke or looped form;

Fig. 3 is a perspective view of one of the end portions of the yoke showing the form the latter assumes after the same has been subjected to a further forging or shaping process;

Fig. 4 is a perspective view illustrating the end portions of the yoke in finished form but prior to the bending of the same in opposite directions so as to form the side portions of the hood;

Fig. 5 is a perspective view of the hooded end of the yoke showing the end portions overlapping at the forward ends of the key slots and in a position to be welded together; and Fig. 6 is a perspective view of the entire yoke after the same has been completely formed.

Throughout the specification and drawings like parts are designated by like reference characters.

It might be here pointed out, before describing in detail the process of manufacturing the yoke shown complete in Fig. 6, that while the steps of the process are described in a certain order, the order selected is merely for convenience, since the yoke may be advantageously produced by arranging these steps in a different order from that described.

The numeral 1 designates a bar of metal of uniform section from which the yoke blank 2, illustrated in Fig. 2 in partially formed state, is produced. One of the advantageous methods of forming said blank 2 is to pass the bar 1 through suitable rolls so as to apply pressure to said bar at a plurality of spaced points. In this manner the blank 2 is provided with end portions 3 and an intermediate portion 4 of greater thickness than the portions 5 which connect the former to the latter. The end portions 3 are adapted, as hereinafter described, to form the hood portions of the finished yoke. The portions 5 are adapted to form the arms of the yoke and the central portion 4 forms the rear end of the yoke. In Fig. 2 I have illustrated the portion 4 in its completed form.

A convenient method for forming the curved portion of the yoke end is to subject the thickened portion to pressure between suitable dies thereby to produce pockets 6 on opposite sides of the intermediate rib 7 and also on opposite sides of the central rib 8. The excess metal forced out of the pockets 6 supplies the necessary metal to form the curved exterior face without setting up latent strains or internal stresses in the metal.

The end portions 3 are next cut longitudinally and are then subjected to a shaping process to form therefrom the Y-shaped members 9 clearly illustrated in Fig. 3, and these Y-shaped members are then subjected to further shaping or forging steps to form therefrom the end portions 10 of the said yoke arms. It will be observed in Fig. 4 that the end portions 10 are provided with hook shaped projections 11, and at the base of the hook shaped portions there is formed a half portion of the key receiving slot 12 and at the opposite end from the hook portion 11 projecting portions 13 are provided, the object of which will be hereinafter described.

At this stage of the process the yoke arms may be bent as indicated in dotted lines in Fig. 2 so as to bring the portion 10 of each arm into alinement, and the lateral extensions of each end portion 10 are bent at right angles to the plane of the arms 14, along the planes indicated by the dotted lines in Fig. 4, and toward the center line of the said yoke, as clearly indicated in Fig. 5. This bending of the lateral extensions of the portions 10 brings the hook shaped members 11 of one end portion into overlapping engagement with the corresponding hook portion of the opposite end portion. The projections 13 formed on one end portion are adapted to contact with the corresponding projection on the opposite end portion to form a closure for the rear end of the coupler key slot 12, and for convenience these contacting portions 13 may be and preferably are butt welded. The faces of the various hook portions 11 are preferably scarfed or beveled as clearly indicated at 15, and the overlapping parts of the end portions 10 are then welded together and the additional metal formed by the overlapping hook portions, worked by any suitable means to form a reinforcement or boss 16 extending around the forward end of each key slot 12 and on the respective outer faces of the walls of the said yoke hood, as will be clearly seen from Fig. 6.

By this construction I produce in effect a unitary yoke hood having the side walls of the yoke of substantially uniform thickness except at points adjacent the outer ends of the key slots 12, and provide the rear end of the yoke with a curved or rounded portion which adequately reinforces the yoke against strain at the juncture of the yoke arms with the said rear end, and produces in effect a unitary forged steel vertical yoke of light weight and maximum strength. The said yoke may of course be manufactured in any suitable length and is adapted to be substituted for the cast steel yoke which at the present time is one of the standard types of draft yokes permitted by the American Railway Association.

Having now fully described my invention, what I claim and desire to secure by Letters Patent is:—

1. The method of manufacturing a hooded yoke which consists in subjecting a bar to a shaping process to form a yoke blank therefrom and subsequently subjecting a portion of said blank to a pressing or forging process to form the rear end of the yoke having a plurality of spaced end walls cutting the ends of the blank longitudinally thereof, shaping said cut ends to adapt the same to form portions of the hooded end of the yoke, bending said blank to bring said shaped ends in alinement, bending portions of said ends in opposite directions to produce oppositely directed engaging portions, and finally welding said engaging portions to each other.

2. The method of manufacturing a hooded yoke which consists in subjecting a bar to a shaping process to produce a yoke blank therefrom, said blank having thickened end portions and a thickened intermediate portion, subjecting said thickened intermediate portion to a further forging process to produce the rear end for the said yoke provided with a curved outer and a straight inner wall, subjecting said thickened end portions to suitable forging and bending processes to form therefrom the walls of the hood portion of said yoke, and finally welding said end portions to unite the same.

3. The method of manufacturing a hooded yoke which consists in forging a bar to form a yoke blank therefrom having thickened end portions, cutting said end portions longitudinally of said blank, flattening said end portions so as to produce a Y-shaped member at each end of the said bar, forming a portion of the coupler key slot in each side of each flattened portion, and subsequently bending the outer portions of said flattened end portions in a direction at right angles to the plane of the yoke arm, bending said yoke arms so as to bring the bent end portions thereof into overlapping engagement, and finally welding the overlapping end portions.

4. The method of manufacturing a hooded yoke which consists in shaping a bar to form a yoke blank therefrom, subjecting the end portions of said blank to a plurality of shaping processes, subjecting an intermediate portion of said blank to a shaping process to form an interiorly ribbed rear end, and finally bending said blank on opposite sides of said rear end so as to bring said end portions into engagement and welding said end portions together.

5. The method of manufacturing a hooded yoke which consists in shaping a blank to form portions of a hood at each end thereof, forming a portion of the coupler key slot on opposite sides of each of said ends, bending said blank and said hood portions to bring the latter into overlapping engagement to complete said key slots, welding said overlapping portions, and finally forming the excess metal caused by said overlapping into bosses surrounding the forward ends of said coupler key slots.

6. The method of manufacturing a hooded yoke which consists in shaping a yoke blank to form laterally extending portions on opposite sides of each end thereof, forming a portion of a key slot on the side edges of said portions, bending said blank to bring said portions into alinement, uniting the adjacent end portions of said blank to form a slotted yoke hood, and finally welding said adjacent portions at opposite ends of said key slots.

7. The method of manufacturing a hooded yoke which consists in shaping the opposite ends of a yoke blank to form portions of a yoke hood, forming portions of the coupler key slot in the side edges of said hood portions, said hood portions each having hook shaped members at the forward ends of said key slot portions, bending said blank to form the arms of the yoke, bending said hood portions to form a hooded end whereby the corresponding hooks are brought into overlapping engagement, and finally uniting each hood portion of one arm to the corresponding portion of the other arm at opposite ends of the said key slots.

8. The method of manufacturing a draft yoke which consists in shaping a suitable yoke blank to form portions of the yoke hood at opposite ends of said blank, forming portions of the coupler key slot in the side edges of each of said hood portions, forming said hood portions with hook shaped projections at the outer extremities of said key slot portions, bending said blank to a U-shape to form the arms of the yoke, bending the side edges of said hood portions in opposite directions to bring said hook portions into overlapping engagement to thereby complete said coupler key slots, and finally welding said overlapping hook portions together whereby a portion of the metal forming the key bearing face of each slot is integral with each arm of said yoke.

9. The method of manufacturing a hooded yoke which consists in shaping a blank at its opposite ends to form laterally projecting portions each having hook shaped members at the forward end of its lateral edges and a flat faced projection at the rear end of said edges, bending said blank into a U-shape to form the yoke arms, bending said lateral projections toward each other to bring said hook members into overlapping engagement and said flat faced projections into abutting engagement to form side members of a slotted yoke hood, and finally welding said engaging portions.

In testimony whereof I affix my signature.

BYERS W. KADEL.